United States Patent
Wang et al.

(10) Patent No.: US 8,546,464 B2
(45) Date of Patent: Oct. 1, 2013

(54) RUBBER COMPOSITIONS INCLUDING METAL-FUNCTIONALIZED POLYISOBUTYLENE DERIVATIVES AND METHODS FOR PREPARING SUCH COMPOSITIONS

(75) Inventors: Xiaorong Wang, Hudson, OH (US); Victor J. Foltz, Akron, OH (US)

(73) Assignee: Bridgestone Corporation, Tokyo (JP)

( * ) Notice: Subject to any disclaimer, the term of this patent is extended or adjusted under 35 U.S.C. 154(b) by 65 days.

(21) Appl. No.: 13/000,696

(22) PCT Filed: Jun. 26, 2009

(86) PCT No.: PCT/US2009/048834
§ 371 (c)(1),
(2), (4) Date: Dec. 27, 2010

(87) PCT Pub. No.: WO2009/158604
PCT Pub. Date: Dec. 30, 2009

(65) Prior Publication Data
US 2011/0098378 A1    Apr. 28, 2011

Related U.S. Application Data

(60) Provisional application No. 61/075,915, filed on Jun. 26, 2008.

(51) Int. Cl.
*B29D 30/06*    (2006.01)
(52) U.S. Cl.
USPC ............................ 523/156; 523/152; 523/155
(58) Field of Classification Search
USPC ....................................................... 523/156
See application file for complete search history.

(56) References Cited

U.S. PATENT DOCUMENTS

| | | |
|---|---|---|
| 2,447,064 A | 8/1948 | Arthur et al. |
| 2,599,553 A | 6/1952 | Hotten |
| 2,768,996 A | 10/1956 | Bulloff |
| 3,018,291 A | 1/1962 | Anderson et al. |
| 3,024,237 A | 3/1962 | Drummond et al. |
| 3,172,892 A | 3/1965 | Le Suer et al. |
| 3,219,666 A | 11/1965 | Norman et al. |
| 3,223,495 A | 12/1965 | Calvino et al. |
| 3,272,746 A | 9/1966 | Le Suer et al. |
| 3,361,673 A | 1/1968 | Stuart et al. |
| 3,367,864 A | 2/1968 | Elliott et al. |
| 3,443,918 A | 5/1969 | Kautsky et al. |
| 3,461,108 A | 8/1969 | Heilman et al. |
| 3,560,455 A | 2/1971 | Hazen et al. |
| 3,560,456 A | 2/1971 | Hazen et al. |
| 3,560,457 A | 2/1971 | Hazen et al. |
| 3,580,893 A | 5/1971 | Heilman |
| 3,706,704 A | 12/1972 | Heilman |
| 3,729,450 A | 4/1973 | Galiano et al. |
| 3,729,451 A | 4/1973 | Blecke et al. |
| 3,738,948 A | 6/1973 | Dunnom |
| 3,836,511 A | 9/1974 | O'Farrell et al. |
| 3,912,764 A | 10/1975 | Palmer, Jr. |
| 3,944,552 A | 3/1976 | Lawrence |
| 3,990,978 A | 11/1976 | Hill |
| 4,003,393 A | 1/1977 | Jaggard et al. |
| 4,007,128 A | 2/1977 | Poklacki |
| 4,016,931 A | 4/1977 | Cryar, Jr. |
| 4,031,014 A | 6/1977 | Griffin, Jr. |
| 4,038,207 A | 7/1977 | Poklacki et al. |
| 4,046,524 A | 9/1977 | van Hesden |
| 4,078,609 A | 3/1978 | Pavlich |
| 4,094,795 A | 6/1978 | DeMartino et al. |
| 4,104,173 A | 8/1978 | Gay et al. |
| 4,115,285 A | 9/1978 | VAN Hesden |
| 4,137,400 A | 1/1979 | DeMartino et al. |
| 4,143,007 A | 3/1979 | DeMartino |
| 4,143,715 A | 3/1979 | Pavlich |
| 4,152,289 A | 5/1979 | Griffin, Jr. |
| 4,152,499 A | 5/1979 | Boerzel et al. |
| 4,153,649 A | 5/1979 | Griffin, Jr. |
| 4,169,818 A | 10/1979 | DeMartino |

(Continued)

FOREIGN PATENT DOCUMENTS

| | | |
|---|---|---|
| EP | 0355895 | 2/1990 |
| EP | 0535642 | 4/1993 |

(Continued)

OTHER PUBLICATIONS

Ow, Say Kyoun, "Investigation of the Role of Sulfate Ions in the Reaction Between Tetrahydroabietic Acid Monolayers and Aluminum Ions," The Institute of Paper Chemistry, Doctor's Dissertation, pp. 1-156 (Jun. 1974).
Cai, Wenwen, Apr. 13, 2011 Office Action from U.S. Appl. No. 12/347,404 (9 pp.).
Bauer, Walter H. et al., "Flow Properties and Structure of Peptized Aluminum Soap-Hydrocarbon Gels", J. Phy. Chem., vol. 62, pp. 106-110 (Jan. 1958).
Bauer, Walter H. et al., "Entrance Effects in Capillary Flow of Aluminum Dilaurate-Toluene Gels", J. Phy. Chem., vol. 62, pp. 1245-1247 (Oct. 1958).
Gaskins, Frederick H. et al., "Rheology of Aluminum Dilaurate in Toluene", Transactions of the Society of Rheology, vol. 13, No. 1, pp. 17-38 (1969).
George, Mathew et al., "Organogels with Complexes of Ions and Phosphorus-Containing Amphiphiles as Gelators. Spontaneous Gelation by in Situ Complexation," Langmuir, 24, pp. 3537-3544 (2008).

(Continued)

*Primary Examiner* — Mark Eashoo
*Assistant Examiner* — Chelsea M Lowe
(74) *Attorney, Agent, or Firm* — Meredith E. Hooker; Nathan T. Lewis

(57) ABSTRACT

A composition includes a vulcanizable diene rubber, a silica filler, and a metal-functionalized polyisobutylene succinic anhydride derivative. In one embodiment the composition has a reduced amount of oil and may include no oil. A tire tread composition includes, a silica filler, a metal-functionalized polyisobutylene succinic anhydride derivative, a rubber matrix, an optional oil, and one or more components selected from the group consisting of carbon black, vulcanizing agent, vulcanization accelerator, tackifier resin, antioxidant, wax, peptizer, vulcanization retarder, activator, processing additive, plasticizer, pigments, and antiozonant. A method for making the rubber composition and the tire tread is also provided.

24 Claims, No Drawings

(56) References Cited

U.S. PATENT DOCUMENTS

| | | |
|---|---|---|
| 4,172,055 A | 10/1979 | DeMartino |
| 4,174,283 A | 11/1979 | Griffin, Jr. |
| 4,169,798 A | 12/1979 | DeMartino |
| 4,200,539 A | 4/1980 | Burnham et al. |
| 4,200,540 A | 4/1980 | Burnham |
| 4,234,435 A | 11/1980 | Meinhardt et al. |
| 4,301,025 A | 11/1981 | Brady et al. |
| 4,316,810 A | 2/1982 | Burnham |
| 4,322,336 A | 3/1982 | Machurat et al. |
| 4,410,437 A | 10/1983 | Erdman |
| 4,446,281 A | 5/1984 | Takamatsu et al. |
| 4,450,254 A | 5/1984 | Isley et al. |
| 4,473,408 A | 9/1984 | Purinton, Jr. |
| 4,507,213 A | 3/1985 | Daccord et al. |
| 4,537,700 A | 8/1985 | Purinton, Jr. |
| 4,595,513 A | 6/1986 | Morgenthaler et al. |
| 4,622,155 A | 11/1986 | Harris et al. |
| 4,781,845 A | 11/1988 | Syrinek et al. |
| 4,787,994 A | 11/1988 | Thorne et al. |
| 4,791,140 A | 12/1988 | Fukasawa et al. |
| 4,795,574 A | 1/1989 | Syrinek et al. |
| 4,860,821 A | 8/1989 | Hagewood |
| 4,877,894 A | 10/1989 | Huddleston |
| 4,880,444 A | 11/1989 | Savins et al. |
| 4,910,267 A | 3/1990 | Oyama et al. |
| 5,034,139 A | 7/1991 | Reid et al. |
| 5,057,233 A | 10/1991 | Huddleston |
| 5,110,485 A | 5/1992 | Huddleston |
| 5,112,507 A | 5/1992 | Harrison |
| 5,137,978 A | 8/1992 | Degonia et al. |
| 5,137,980 A | 8/1992 | Degonia et al. |
| 5,150,754 A | 9/1992 | Phelps et al. |
| 5,175,225 A | 12/1992 | Ruhe, Jr. |
| 5,190,675 A | 3/1993 | Gross |
| 5,202,035 A | 4/1993 | Huddleston |
| 5,271,464 A | 12/1993 | McCabe |
| 5,281,023 A | 1/1994 | Cedillo et al. |
| 5,286,799 A | 2/1994 | Harrison et al. |
| 5,319,030 A | 6/1994 | Harrison et al. |
| 5,393,309 A | 2/1995 | Cherpeck |
| 5,441,340 A | 8/1995 | Cedillo et al. |
| 5,514,645 A | 5/1996 | McCabe et al. |
| 5,523,417 A | 6/1996 | Blackborow et al. |
| 5,565,528 A | 10/1996 | Harrison et al. |
| 5,616,668 A | 4/1997 | Harrison et al. |
| 5,624,182 A | 4/1997 | Dearing, Sr. et al. |
| 5,625,004 A | 4/1997 | Harrison et al. |
| 5,777,025 A | 7/1998 | Spencer et al. |
| 5,792,729 A | 8/1998 | Harrison et al. |
| 5,854,327 A * | 12/1998 | Davis et al. ................. 524/445 |
| 5,916,961 A | 6/1999 | Hergenrother et al. |
| 5,922,792 A | 7/1999 | Wideman et al. |
| 5,972,852 A | 10/1999 | Robson |
| 5,972,853 A | 10/1999 | Boffa et al. |
| 5,981,662 A | 11/1999 | D'Sidocky et al. |
| 5,990,053 A | 11/1999 | Jones et al. |
| 6,004,908 A | 12/1999 | Graham et al. |
| 6,054,417 A | 4/2000 | Graham et al. |
| 6,133,354 A | 10/2000 | Wang et al. |
| 6,174,989 B1 | 1/2001 | D'Sidocky et al. |
| 6,204,354 B1 | 3/2001 | Wang et al. |
| 6,207,763 B1 | 3/2001 | Wang et al. |
| 6,261,998 B1 | 7/2001 | Amin et al. |
| 6,262,130 B1 | 7/2001 | Derian et al. |
| 6,271,409 B1 | 8/2001 | Geib |
| 6,297,201 B1 | 10/2001 | Geib |
| 6,302,209 B1 | 10/2001 | Thompson, Sr. et al. |
| 6,342,468 B1 | 1/2002 | Geib |
| 6,350,800 B1 | 2/2002 | Wang et al. |
| 6,353,054 B1 | 3/2002 | Wang et al. |
| 6,359,064 B1 | 3/2002 | Wang et al. |
| 6,369,166 B1 | 4/2002 | Wang et al. |
| 6,372,855 B1 | 4/2002 | Chino et al. |
| 6,384,134 B1 | 5/2002 | Hall et al. |
| 6,401,776 B1 | 6/2002 | Wang et al. |
| 6,403,724 B1 | 6/2002 | Wang |
| 6,417,259 B1 | 7/2002 | Wang et al. |
| 6,458,881 B1 | 10/2002 | Pan et al. |
| 6,602,828 B2 | 8/2003 | Armin et al. |
| 6,632,781 B2 | 10/2003 | Harrison et al. |
| 6,699,813 B2 | 3/2004 | Luo et al. |
| 6,706,823 B2 | 3/2004 | Wang et al. |
| 6,719,053 B2 | 4/2004 | Thompson |
| 6,849,581 B1 | 2/2005 | Thompson et al. |
| 7,314,850 B2 | 1/2008 | Taylor et al. |
| 7,328,744 B2 | 2/2008 | Taylor et al. |
| 7,429,393 B2 | 9/2008 | Wang et al. |
| 7,521,400 B2 | 4/2009 | Samuel |
| 7,534,745 B2 | 5/2009 | Taylor et al. |
| 7,700,673 B2 | 4/2010 | Wang et al. |
| 2002/0022085 A1 | 2/2002 | Thise et al. |
| 2002/0188064 A1 | 12/2002 | Wang et al. |
| 2003/0130398 A1 | 7/2003 | Wang |
| 2003/0130401 A1 | 7/2003 | Lin et al. |
| 2005/0022915 A1 | 2/2005 | Bowen, III et al. |
| 2006/0223945 A1* | 10/2006 | Hollingshurst et al. ...... 525/285 |
| 2007/0015853 A1* | 1/2007 | Weng et al. .................. 523/333 |
| 2007/0208122 A1 | 9/2007 | Bhandarkar et al. |
| 2008/0153972 A1 | 6/2008 | Wang et al. |

FOREIGN PATENT DOCUMENTS

| | | |
|---|---|---|
| EP | 0542380 | 5/1993 |
| EP | 0570159 | 11/1993 |
| EP | 0602863 | 6/1994 |
| EP | 0864606 | 9/1998 |
| EP | 1270657 | 1/2003 |
| EP | 1803771 | 7/2007 |
| GB | 695113 | 8/1953 |
| WO | 9008170 | 7/1990 |
| WO | WO 02/096677 A1 | 12/2002 |
| WO | 2004058874 | 7/2004 |
| WO | 2007070063 | 6/2007 |

OTHER PUBLICATIONS

Harple, Warren W. et al., "Infrared Absorption Spectra of Aluminum Soaps", Analytical Chemistry, vol. 24, No. 4, pp. 635-638 (Apr. 1952).

Ludke, Willard O. et al., "Mechanism of Peptization of Aluminum Soap—Hydrocarbon Gels Based Upon Infrared Studies", J. Phy. Chem. vol. 59, pp. 222-225 (Mar. 1955).

McGee, Charles G., "Aluminum Monolaurate and Proposed Structures for Aluminum Soaps", Am. Chem. Soc. vol. 71, pp. 278-282 (Jan. 1949).

Mohajer, Y. et al., "New Polyisobutylene-Based Model Elastomeric Ionomers. VI. The Effect of Excess Neutralizing Agents on Solid-State Mechanical Properties", Applied Polymer Science, vol. 29, No. 6, pp. 1943-1950 (1984).

Mysels, Karol J., "Studies of Aluminum Soaps: IX. Electron Microscope View of Lyophilized Aluminum Laurate", The Journal of General Physiology, pp. 159-161 (Jul. 15, 1946).

Nora, Angelo et al., "Metallic Soaps", internet article, XP-002524032, pp. 1-16 (Sep. 15, 2001).

Trappe, V. et al., "Scaling of the Viscoelasticity of Weakly Attractive Particles", Physical Review Letters, vol. 85, No. 2, pp. 449-452 (Jul. 10, 2000).

Wang, Xiaorong et al., "Gelling nature of aluminum soaps in oils," Journal of Colloid and Interface Science, 331, pp. 335-342 (Nov. 13, 2008).

Weber, Neill et al., "Flow Properties of Aluminum Dilaurate-Toluene Gels", J. Phys. Chem., vol. 60, pp. 270-273 (Mar. 1956).

Weill, J. et al., "Reaction du Polyisobutene Chlore Sur L'Anhydride Maleique: Mecanisme; Catalyse Par L'Anhydride Dichloromaleique", Revue de L'Institut Francais due Petrole, vol. 40, No. 1, pp. 77-89 [Jan.-Feb. 1985].

Database WPI Week 199001, Thomson Scientific, London, GB; AN 1990-004108 (1 pg.).

Admasu, Atnaf S., Jan. 21, 2009 Office Action from U.S. Appl. No. 11/615,659 (10 pp.).

Admasu, Atnaf S., Aug. 18, 2009 Final Office Action from U.S. Appl. No. 11/615,659 (8 pp.).

Admasu, Atnaf S., Nov. 10, 2009 Advisory Action from U.S. Appl. No. 11/615,659 (8 pp.).
Scott, Angela C., Nov. 28, 2007 Office Action from U.S. Appl. No. 11/646,981 (7 pp.).
Scott, Angela C., Jun. 9, 2008 Final Office Action from U.S. Appl. No. 11/646,981 (6 pp.).
Scott, Angela C., Nov. 24, 2008 Office Action from U.S. Appl. No. 11/646,981 (5 pp.).
Scott, Angela C., Jul. 7, 2009 Office Action from U.S. Appl. No. 11/646,981 (6 pp.).
Scott, Angela C., Jan. 8, 2010 Final Office Action from U.S. Appl. No. 11/646,981 (6 pp.).
Scott, Angela C., Mar. 26, 2010 Office Action from U.S. Appl. No. 11/646,981 (6 pp.).
Scott, Angela C., Sep. 2, 2010 Final Office Action from U.S. Appl. No. 11/646,981 (7 pp.).
Sun, Yuejian, English translation of Oct. 8, 2010 First Office Action from Chinese Patent Application No. 200610170337.2 (10 pp.).
Mettler, Rolf-Martin, Apr. 10, 2007 extended European search report from European Patent Application No. 06256456.2 (6 pp.).
Jan. 9, 2008 Office Action from European Patent Application No. 06256456.2 (6 pp.).
Schmitt, Johannes, Jun. 2, 2009 extended European search report from European Patent Application No. 08254196.2 (7 pp.).
Schmitt, J., Dec. 28, 2009 Office Action from European Patent Application No. 08254196.2 (1 pg.).
Schmitt, Johannes, Aug. 26, 2010 Office Action from European Patent Application No. 08254196.2 (5 pp.).
Kim, Gye Sook, Feb. 2, 2010 International Search Report from PCT/US2009/048834 (4 pp.).
Notification of First Office Action, The State Intellectual Property Office of P.R. China, Application No. 200980132972.3, Aug. 28, 2012.
Cai, Wenwen. Non-Final Office Action U.S. Appl. No. 12/347,404 Apr. 13, 2011.
Funkhouser, Gary P. et al. "Rheological Comparison of Organogelators Based on Iron and Aluminum Complexes of Dodecylmethylphosphinic Acid and Methyl Dodecanephosphonic Acid", Langmuir, vol. 25, Issue 15, pp. 8672-8677 (2009).
Cai, Wenwen. Final Office Action U.S. Appl. No. 12/347,404 Aug. 26, 2011.
English Translation of Nov. 30, 2011 Office Action from Chinese Patent Application No. 200810191041.8 (6 pp.).

* cited by examiner

RUBBER COMPOSITIONS INCLUDING METAL-FUNCTIONALIZED POLYISOBUTYLENE DERIVATIVES AND METHODS FOR PREPARING SUCH COMPOSITIONS

CROSS REFERENCE TO RELATED APPLICATION

This application is a national stage application of PCT/US09/48834, filed Jun. 26, 2009, which in turn claims the benefit of priority to U.S. provisional application 61/075,915, filed Jun. 26, 2008.

FIELD

The present disclosure is generally related to a rubber composition. More particularly, the present disclosure is related to a reduced oil rubber composition comprising an oil substitute.

BACKGROUND

In the tire industry, rubber compositions are engineered to have a balance of properties; for example, tensile strength, tear resistance, rolling resistance, traction, and handling. Typically, modifying a composition to improve one or more of these qualities makes it difficult to maintain at least one other quality. While improvement in such qualities as traction, tensile strength, and tear resitance is highly desirable, maintaining low rolling resistance is also highly important, particularly with the increasing prices of fuel and other concerns in recent years. Thus, additives that improve the traction and/or tensile strength and tear resistance characteristics of tires and that also maintain a comparable low level of rolling resistance are highly desirable.

SUMMARY

A composition includes a vulcanizable diene rubber and a metal-functionalized polyisobutylene succinic anhydride derivative. In one embodiment the composition has 15 phr or less of oil, including no oil. In one embodiment the composition also includes a reinforcing filler.

A tire tread composition includes, a reinforcing filler, a metal-functionalized polyisobutylene succinic anhydride derivative, a rubber matrix, an optional oil, and one or more components selected from the group consisting of carbon black, vulcanizing agent, vulcanization accelerator, tackifier resin, antioxidant, fatty acids, zinc oxide, wax, peptizer, vulcanization retarder, activator, processing additive, plasticizer, pigments, and antiozonant.

A method of making a rubber composition includes the steps of: combining a solvent, a base, and a polyisobutylene succinic anhydride derivative and mixing to form solution A; adding a source of metal ions to solution A and mixing to form a product A, the metal being selected from the group consisting of group III and transition metals; whereby product A includes a metal-functionalized polyisobutylene succinic anhydride derivative; and combining the metal-functionalized polyisobutylene succinic anhydride derivative with a diene rubber.

DETAILED DESCRIPTION

The addition of the metal-functionalized polyisobutylene succinic anhydride derivative to a rubber composition allows for an elimination or a reduction in the amount of processing oil required in the rubber composition. The composition is useful in manufacturing rubber articles such as tires with reduced rolling resistance, improved wet/snow traction and winter softness, improved dynamic stiffness, improved tensile strength, easy handling, and/or compatibility with higher environmental standard, among others.

It is to be understood herein, that if a "range" or "group" is mentioned with respect to a particular characteristic of the present invention, for example, molecular weight, ratio, percentage, and temperature etc., it relates to and explicitly incorporates herein each and every specific member and combination of sub-ranges or sub-groups therein whatsoever. Thus, any specified range or group is to be understood as a shorthand way of referring to each and every member of a range or group individually as well as each and every possible sub-range or sub-group encompassed therein.

As will be used in this description, the term "phr" refers to "parts by weight of a respective material per 100 parts by weight of the rubber matrix." The term "essentially free of" means less than 1%.

Without being bound by theory, in embodiments, the metal-functionalized polyisobutylene succinic anhydride derivative contains at least three major species (A, B, and C). It is difficult to purify or separate them, as they may change from one to another once formed and when utilized in the subject rubber compositions. Without being bound by theory, it is believed that each species is useful in the rubber compound.

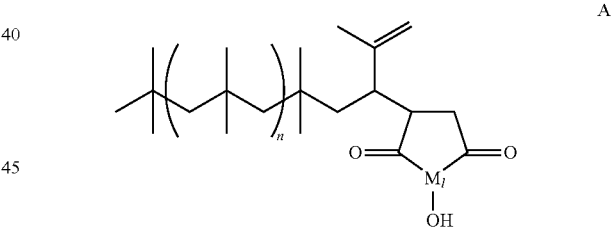

A

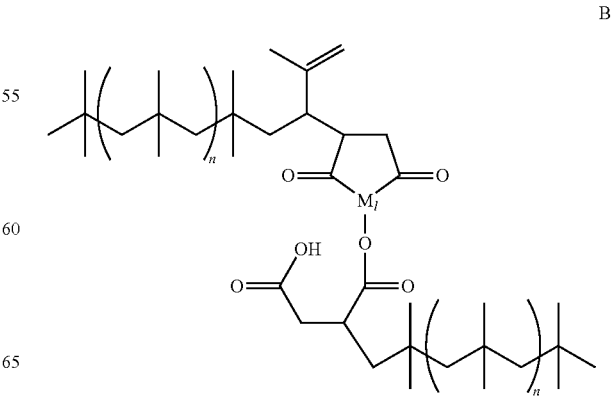

B

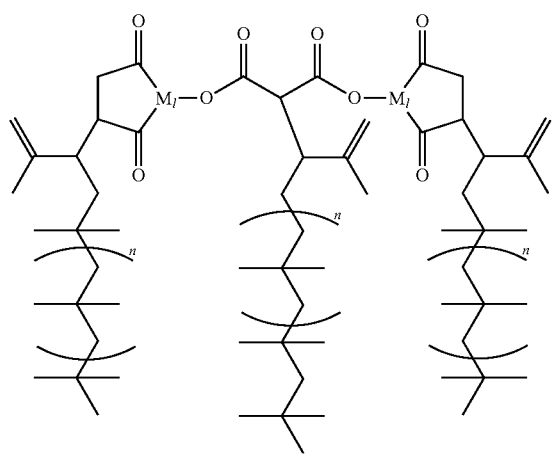

The polyisobutylene chain of the metal-functionalized polyisobutylene succinic anhydride derivative generally comprises from 4 to 2,000,000 carbon atoms, such as 8 to 100,000, 16 to 10,000, and 20 to 100 carbon atoms.

The weight-average molecular weight of the metal-functionalized polyisobutylene succinic anhydride derivative may, for example, be 500 to 100,000, such as 1,000 to 50,000, 500 to 10,000, or 1,000 to 5,000. The number-average molecular weight of the metal-functionalized polyisobutylene succinic anhydride derivative may, for example, be 250 to 100,000, such as 500 to 50,000, 600 to 5,000, or 800 to 2,500.

Without being bound by theory, in an embodiment, the polyisobutylene chain is of the structure shown below:

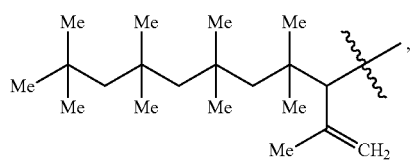

wherein Me represents a methyl group.

The metal-functionalized polyisobutylene succinic anhydride derivative may be prepared from the metathesis reaction between a metal ion donator and a polyisobutylene succinic anhydride. Without being bound by theory, the reaction is as shown below:

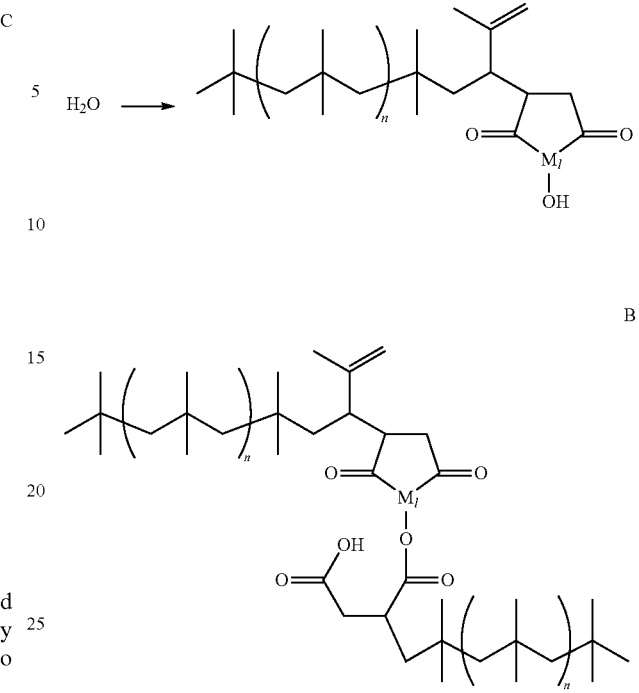

wherein $M_l Z_m$ is the metal donator and M is the metal.

In an example embodiment the metal donator is aluminum potassium sulfate and, without being bound by theory, the reaction proceeds as follows:

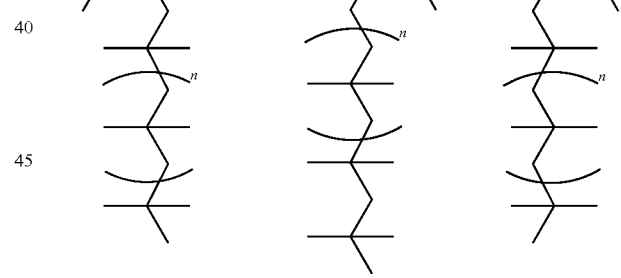

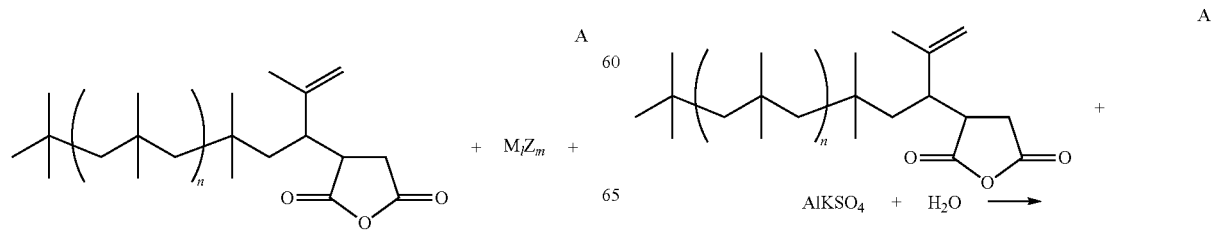

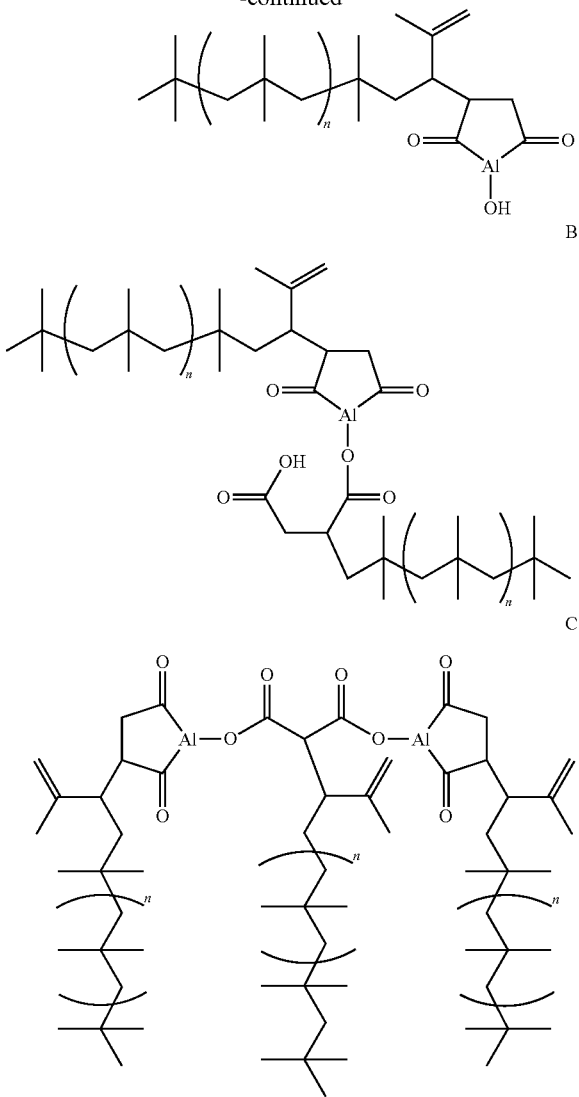

In an embodiment, the polyisobutylene succinic anhydride derivative may be prepared from the reaction between a polyisobutylene, with maleic anhydride. Polyisobutylenes can be obtained according to known methods by cationic polymerization of isobutylene, where a double bond remains in the last monomer unit incorporated after termination of the polymer chain, as described in DE-A 27 02 604 and EP-A 0 145 235. Polyisobutylenes from a $BF_3$ catalyzed polymerization as described in EP-A 0 628 575 can also be used. These polyisobutylenes contain a high proportion of vinylidene ($-C(CH_3)=CH_2$) and dimethylvinyl ($-CH=C(CH_3)_2$) end groups. Polyisobutylenes having terminal unsaturation can also be prepared by living cationic polymerization of isobutene, as described, for example, in "Carbocationic Macromolecular Engineering", Kennedy and Ivan, Hauser Publishers, 1992, or EP-A 713 883. The polymerization is in this case initiated by suitable initiator molecules (inifers), in general organic tertiary halides such as meta- or para-dicumyl chloride, and a Lewis acid such as titanium tetrachloride. The halogen-terminated polymer formed can be dehydrohalogenated by treatment with a base such as potassium tert-butoxide or by thermal treatment, forming vinylidene groups ($-CH_2-C(CH_3)=CH_2$) at the ends of the molecules. As an alternative, the halogen-terminated polymer can be treated with allyltrimethylsilane, as a result of which the ends of the molecules become terminated by allyl groups ($-CH_2-CH=CH_2$), as described in EP-A 264 214. The initiator can be selected so that polymer chains grow in one direction or more than one direction by addition of isobutene molecules, resulting in linear or star-shaped polymers.

In various embodiments, one can use conventional polyisobutylene, or high methylvinylidene polyisobutylene in the preparation of the polyisobutylene succinic anhydrides. One can use thermal, chlorination, free radical, acid catalyzed, or any other process in this preparation. Specific examples of suitable polyisobutylene succinic anhydrides are thermal-produced PIBSA (polyisobutenyl succinic anhydride) described in U.S. Pat. No. 3,361,673; chlorination-produced PIBSA described in U.S. Pat. No. 3,172,892; a mixture of thermal and chlorination-produced PIBSA described in U.S. Pat. No. 3,912,764; high succinic ratio PIBSA described in U.S. Pat. No. 4,234,435; PolyPIBSA described in U.S. Pat. Nos. 5,112,507 and 5,175,225; high succinic ratio PolyP-IBSA described in U.S. Pat. Nos. 5,565,528 and 5,616,668; free radical PIBSA described in U.S. Pat. Nos. 5,286,799, 5,319,030, and 5,625,004; PIBSA made from high methylvinylidene polybutene described in U.S. Pat. Nos. 4,152,499, 5,137,978, and 5,137,980; high succinic ratio PIBSA made from high methylvinylidene polybutene described in European Patent Application Publication EP 355 895; terpolymer PIBSA described in U.S. Pat. No. 5,792,729; sulfonic acid PIBSA described in U.S. Pat. No. 5,777,025 and European Patent Application Publication No. EP 542 380; and purified PIBSA described in U.S. Pat. No. 5,523,417 and European Patent Application Publication EP 602 863.

In embodiments, the metal-functionalized polyisobutylene succinic anhydride may also be selected from copolymers of an olefin with an unsaturated acidic reactant which are well known in the art, for example, U.S. Pat. Nos. 3,461,108; 3,560,455; 3,560,456; 3,560,457; 3,580,893; 3,706,704; 3,729,450; 3,729,451; and 5,112,507.

PIBSA produced by the thermal process has been characterized as a monomer containing a double bond in the product. The chlorination process-produced PIBSAs have been characterized as monomers containing either a double bond, a ring other than a succinic anhydride ring, and/or chlorine in the product. See J. Weill and B. Sillion, "Reaction of Chlorinated Polyisobutene with Maleic Anhydride: Mechanism Catalysis by Dichloromaleic Anhydride", Revue de l'Institut Francais du Petrole, Vol. 40, No. 1, pp. 77-89 (January-February, 1985).

Reaction of polyalkenes, such as polyisobutenes, with maleic anhydride, in the presence of a free radical initiator, can result in a product similar to that produced by the thermal process for PIBSA which is a monomeric one-to-one adduct, as described in, for example, U.S. Pat. No. 3,367,864.

Polyisobutylene succinic anhydride may also be commercially obtained. For example, PIBSA under the trade name OLOA 15500 can be obtained from Chevron Oronite Company LLC, 1301 McKinney Street, Houston, Tex. 77010 U.S.A. OLOA 15500 is derived from polybutene with a number average molecular weight of 1000, and may be produced via a thermal process. The acid number of OLOA 15500 is 92 as measured with OPM 556.

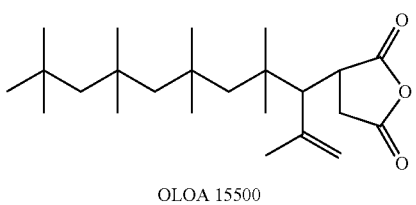 [SMILES: C=C(C)C(C1CC(=O)OC1=O)C(C)(C)CC(C)(C)CC(C)(C)CC(C)(C)C]

OLOA 15500

Suitable metal donators may, for example, correspond to the formula: $M_lZ_m$. Where M is a metal, such as aluminum, iron, or titanium; and where Z is selected from the group consisting of potassium sulfate, hydroxide, sulfate, and phosphate, and l and m are independently integers from 1 to 20. For example, aluminum potassium sulfate is known to be an inexpensive and effective source of aluminum metal ions. Aluminum is also non-toxic and relatively inexpensive.

The metal of the metal-functionalized polyisobutylene succinic anhydride derivative may be selected from transition metals and group III of the periodic table. Specific examples include aluminum, iron and titanium.

In exemplified embodiments, the metal-functionalized polyisobutylene succinic anhydride derivatives were prepared from the reactions between PIBSA (OLOA 15500) and aluminum potassium sulfate dodecahydrate.

The reaction between PIBSA and suitable metal ions can be carried out at a temperature ranging from 0° C. to 300° C., for a period from 48 hours to 0.5 hour. Then, the reaction mixture may be placed in a vacuum oven at from 25° C. to 200° C. to dehydrate for 1 hour to 1 month.

Example amounts of the metal-functionalized polyisobutylene succinic anhydride derivative in the composition range from 0.1 phr to 100 phr, from 1 phr to 80 phr, or from 15 phr to 30 phr.

A general exemplary method of making a rubber composition includes the preparation of the metal-functionalized polyisobutylene succinic anhydride derivative by the following method. Combining a solvent, a base, and a polyisobutylene succinic anhydride and mixing these to form a solution A. A source of metal ions, which may be in solution, is added to solution A and mixed to form product A that contains a metal-functionalized polyisobutylene succinic anhydride derivative. The metal-functionalized polyisobutylene derivative is then combined with a diene rubber composition.

A more specific exemplary method of making a rubber composition includes synthesizing a metal-functionalized polyisobutylene succinic anhydride derivative and combining it with a diene rubber. In an exemplary step, a solvent, a base, and a polyisobutylene succinic anhydride along with an acid are mixed together to form a solution A. Examples of suitable solvents include, but are not limited to, water, THF, acetone, acetonitrile, DMF, DMSO, acetic acid, n-butanol, isopropanol, n-propanol, ethanol, methanol, esters, such as isopropyl acetate, ketones, such as methyl isobutyl ketone, and alcohols such as tetrahydropyran, diglyme, 1,2-dimethoxyethene, 1,6-dimethoxyhexane, 1,3-dioxane, 1,4-dioxane, anisole, ethoxybenzene, and mixtures thereof. Examples of bases include, but are not limited to, sodium hydroxide, potassium hydroxide, potassium carbonate, calcium carbonate, and ammonia.

In another step of the exemplary method, a source of metal ions is prepared. This may be done by adding a source of such metal ions to a solvent such as water and forming a solution B. The source of metal ions may, for example, be those described above that correspond to the formula: $M_lZ_m$.

Solution A and solution B are then mixed together to form product A. Stirring and heating may be used to induce the metal ions of solution B to associate with the polyisobutylene succinic anhydride, thereby creating a metal-functionalized polyisobutylene succinic anhydride derivative that is insoluble in the solvent. Product A includes the metal-functionalized polyisobutylene succinic anhydride derivative, and may include other reaction residues, such as potassium sulfate and/or water. Product A may be washed with pure water and dried at vacuum.

The rubbery matrix may comprise any solution polymerizable or emulsion polymerizable elastomer, for example, diene homopolymers, and copolymers and terpolymers of conjugated diene monomers with vinyl aromatic monomers and trienes such as myrcene. Exemplary diene homopolymers are those prepared from diolefin monomers having from 4 to 12 carbon atoms. Exemplary vinyl aromatic polymers are those prepared from monomers having from 8 to 20 carbon atoms.

Specific examples of suitable diene monomers include, but are not limited to, 1,3-butadiene, isoprene (2-methyl-1,3-butadiene), cis- and trans-piperylene(1,3-pentadiene), 2,3-dimethyl-1,3-butadiene, 1,3-pentadiene, cis- and trans-1,3-hexadiene, cis- and trans-2-methyl-1,3-pentadiene, cis- and trans-3-methyl-1,3-pentadiene, 4-methyl-1,3-pentadiene, 2,4-dimethyl-1,3-pentadiene, and mixtures thereof.

Any compound that comprises at least one vinyl group and at least one aromatic group may be used as the mono-vinyl aromatic monomer. Suitable mono-vinyl aromatic monomers include, but are not limited to styrene, ethylvinylbenzene, α-methyl-styrene, 1-vinyl naphthalene, 2-vinyl naphthalene, vinyl toluene, methoxystyrene, t-butoxystyrene, and the like; as well as alkyl, cycloalkyl, aryl, alkaryl, and aralkyl derivatives thereof, in which the total number of carbon atoms in the monomer is generally not greater than 8; and mixtures thereof. In exemplified embodiments, the mono-vinyl aromatic monomer comprises styrene.

In certain exemplary embodiments, the conjugated diene monomer and vinyl aromatic monomer are used at the weight ratios of 1:99 to 99:1, or 15:85 to 85:15. The rubbery matrix can have a 1,2-microstructure content ranging from 1 percent to 99 percent, or polymers, copolymers or terpolymers having 1,2-microstructure content of from 1 to 99 percent, based upon the diene content of the rubbery matrix. The copolymers may be random copolymers, which result from simultaneous copolymerization of the monomers with randomizing agents, as is known in the art.

Optionally, other vinyl comonomers that can potentially be polymerized into the rubbery matrix of the composition may be used. Such comonomers include, but are not limited to, alkyl(meth)acrylates, such as methyl acrylate, ethyl acrylate, butyl acrylate, methyl methacrylate and the like; α-olefins such as ethylene, propylene, 1-butene and the like; vinyl halides, such as vinylbromide, chloroethene(vinylchloride), vinylfluoride, vinyliodide, 1,2-dibromoethene, 1,1-dichloroethene(vinylidene chloride), 1,2-dichloroethene and the like; vinyl esters, such as vinyl acetate; α,β-olefinically unsaturated nitriles, such as acrylonitrile and methacrylonitrile; α,β-olefinically unsaturated amides, such as acrylamide, N-methyl acrylamide, N,N-dimethylacrylamide, methacrylamide; vinylpyridine, methacrylic acid, itaconic acid, acrylic acid, and the like, and mixtures thereof.

The rubber matrix may comprise rubbers such as natural rubber, synthetic rubber and blends thereof. Such rubbers are well known to those skilled in the art and include synthetic polyisoprene rubber, styrene-butadiene rubber (SBR), styrene-isoprene-butadiene rubber, styrene-isoprene rubber, butadiene-isoprene rubber, polybutadiene, butyl rubber, neoprene, ethylene-propylene rubber, ethylene-propylene-diene rubber (EPDM), acrylonitrile-butadiene rubber (NBR), silicone rubber, the fluoroelastomers, ethylene acrylic rubber, ethylene vinyl acetate copolymer (EVA), epichlorohydrin rubbers, chlorinated polyethylene rubbers, chlorosulfonated polyethylene rubbers, hydrogenated nitrile rubber, tetrafluoroethylene-propylene rubber, and the like, and mixtures thereof.

The rubber matrix when used in tires, hoses, power transmission belts and other industrial products has good compatibility with fillers, such as carbon black and silica. To attain improved interaction with fillers, the rubbery matrix can be functionalized with various compounds, such as amines.

A rubber matrix such as diene polymer may be prepared and recovered according to various suitable methods such as batch, semi-continuous, or continuous operations. The polymerization can also be carried out in a number of different polymerization reactor systems, including but not limited to bulk polymerization, vapor phase polymerization, solution polymerization, suspension polymerization, coordination polymerization and emulsion polymerization. The polymerization may be carried out using free radical mechanism, anionic mechanism, or cationic mechanism. An exemplary method of polymerization is emulsion polymerization with commonly used free radical initiators.

Various reaction procedures and systems may be used for the rubber polymerization. For example, in batch operations, the polymerization time of diene monomers can be varied as desired; it may vary, for example, from a few minutes to several days. Polymerization in batch processes may be terminated when the monomer is no longer absorbed, or earlier, if desired, e.g., if the reaction mixture becomes too viscous. In continuous operations, the polymerization mixture may be passed through a reactor of any suitable design. The polymerization reactions in such cases are suitably adjusted by varying the residence time. Residence times may range, for example, from 10 to 15 minutes to 24 or more hours.

For anionic polymerization, quenching of the reaction with a functional terminating agent provides a way of functionalization of the rubbery matrix. Any compounds providing terminal functionality (i.e., endcapping) that are reactive with the polymer bound carbon-lithium moiety can be selected to provide a desired functional group. Exemplary compounds include ketimines, Michler's ketone, 1,3-dimethyl-2-imidazolidinone, 1-alkyl substituted pyrrolidinones, 1-aryl substituted pyrrolidinones, tin tetrachloride, tributyl tin chloride, carbon dioxide, and the like, and the mixtures thereof. Further examples of reactive compounds include the terminators described in U.S. Pat. Nos. 5,521,309 and 5,066,729, the subject matter of which, pertaining to terminating agents and terminating reactions, is hereby incorporated by reference. Other useful terminating agents can include those of the structural formula $(R)_aZX_b$, where Z is tin or silicon. R is one or more hydroxyl groups; an alkyl having from 1 to 20 carbon atoms; a cycloalkyl having from 3 to 20 carbon atoms; an aryl having from 6 to 20 carbon atoms, or an aralkyl having from 7 to 20 carbon atoms. For example, R can include methyl, ethyl, n-butyl, neophyl, phenyl, cyclohexyl or the like. X is a halogen, such as chlorine or bromine, or —OH or alkoxy (—OR), "a" is an integer from 0 to 3, and "b" is an integer from 1 to 4, where a+b=4. Examples of such terminating agents include tin tetrachloride, tributyl tin chloride, butyl tin trichloride, butyl silicon trichloride, as well as tetraethoxysilane, $Si(OEt)_4$, and methyl triphenoxysilane, $MeSi(OPh)_3$.

Other compounds that are reactive with the polymer bound carbon-lithium moiety can also be selected to provide a desired functional group.

Another embodiment includes terminating by a coupling reaction with, for example, tin tetrachloride or other coupling agent such as silicon tetrachloride or esters. High levels of tin coupling are desirable in order to maintain good processability in the subsequent manufacturing of rubber products.

In an exemplified embodiment, the rubber matrix comprises a solution polymerized SBR rubber produced by Firestone Synthetic (Akron, Ohio), having the following characteristics: 23.5% styrene, a Mooney viscosity of 55 at 100° C., and 11% vinyl content.

Oil has been conventionally used as a compounding and processing aid in rubber compositions. For example, high levels of aromatic processing oils are often included in tire tread formulations to increase dry traction characteristics, as described in e.g. U.S. Pat. No. 4,861,131.

Examples of oils useful in the rubber compositions described herein include, but are not limited to, aromatic, naphthenic, and/or paraffinic hydrocarbons extracted from certain petroleum fractions. Other useful oils include those containing less than 3 wt % of polycyclic aromatic compounds (as measured by IP346) ("low PCA oils"). Such low PCA oils are increasingly used in an effort to reduce the amount of polycyclic aromatic compounds present in rubbers used in tires. Commercially available low PCA oils include various naphthenic oils, mild extraction solvates (MES) and treated distillate aromatic extracts (TDAE).

In a variety of exemplary embodiments, the metal-functionalized polyisobutylene succinic anhydride is used along with the oil, or is used to replace a portion of the oil, or is used to replace the entirety of the oil. As such, typical amounts of oil may broadly range from 0 phr to 100 phr, from 0 phr to 50 phr, or from greater than 0 phr to 25 phr, or in some instances less than 20 phr, or less than 15 phr based on 100 phr rubbery matrix in the composition. However, the total amount of the metal-functionalized polyisobutylene succinic anhydride derivative and the oil should be controlled within the range of from 1 phr to 200 phr, such as from 1 phr to 100 phr, 5 phr to 50 phr, or 15 phr to 30 phr based on 100 phr rubbery matrix of the composition.

In exemplified embodiments, an aromatic oil commercially available under the trade name of Mobilsol-90 (Mobil, Fairfax, Va.) was used in an amount of 0-15 phr, based on 100 phr rubbery matrix of the composition.

The example composition disclosed herein also comprises a silica filler. Exemplary silica fillers include, but are not limited to, precipitated amorphous silica, wet silica (hydrated silicic acid), dry silica (anhydrous silicic acid), fumed silica, and precipitated amorphous wet-process, hydrated silicas. Precipitated amorphous wet-process, hydrated silicas are produced by a chemical reaction in water, from which they are precipitated as ultrafine, spherical particles. These primary particles strongly associate into aggregates, which in turn combine less strongly into agglomerates. An example particle size for the silica is 3-500 nm, with an aggregated particle size of 10 nm to 20 µm. Silicas with other particle size can also be used.

The silica filler may be selected from any of the commonly available silicas. Some of the commercially available silicas which can be used include, but are not limited to, Hi-Sil® 190, Hi-Sil® 210, Hi-Sil® 215, Hi-Sil® 233, Hi-Sil® 243, and the like, produced by PPG Industries (Pittsburgh, Pa.). A number of useful commercial grades of different silicas are also available from Degussa Corporation (e.g., VN2, VN3), Rhone Poulenc (e.g., Zeosil® 1165 MP), and J.M. Huber Corporation.

A typical amount of silica, when used, ranges from 5 phr to 200 phr, such as from 10 phr to 150 phr, from 40 phr to 100 phr, and from 50 phr to 80 phr, based on 100 phr rubbery matrix in the composition.

In exemplified embodiments, a SiO filler was used in an amount of 60-80 phr, such as 70 phr, based on 100 phr rubbery matrix of the composition. The SiO filler, was a hydrated amorphous silica, purchased from PPG (Pittsburg, Pa.).

To improve filler dispersion and reduce agglomeration and re-agglomeration of silica aggregates, a coupling agent may be used along with silica fillers. Typically, a silica coupling agent has at least two functional groups, one of which is reactive with the silica surface such as a silyl group, and another one can bind to the rubbery matrix such as mercapto, amino, vinyl, epoxy or sulfur group. Exemplary coupling agents include, but are not limited to, mercaptosilanes and organosilane polysulfides having an average of from 3.5 to 4 sulfur atoms in its polysulfidic bridge. For example, bis-(3-trialkoxysilylorgano)polysulfides such as bis-(3-triethoxysilyl-propyl)tetrasulfide, which is sold commercially as Si69 by Degussa has an average of about 3.8 sulfur atoms in its polysulfidic bridge. It is envisioned that such polysulfide can be a sulfur donor, by liberating free sulfur, during typical high shear mixing of a rubber composition at an elevated temperature such as, for example, at temperatures of 100° C. and above. The small amount of free liberated sulfur may be then available to combine with and/or possibly partially vulcanize, a diene-based matrix.

In exemplified embodiments, a silane coupling agent under the trade name of Si 69 was used in an amount of 5-15 phr, such as 8 phr, based on 100 phr rubbery matrix of the composition. Si 69 is bis-(3-triethoxysilyl propyl)tertrasulfic purchased from Degussa (Parsippany, N.J.).

A silica dispersing aid such as monofunctional silica shielding agent may be used along with silica fillers. Examples of silica dispersing aid include silica hydrophobating agents that chemically react with the surface silanol groups on the silica particles but are not reactive with the matrix elastomer and agents which physically shield the silanol groups, to prevent reagglomeration (flocculation) of the silica particles after compounding. Specific examples of silica dispersing aid include alkyl alkoxysilanes, glycols (e.g., diethylene glycol or polyethylene glycol), fatty acid esters of hydrogenated and non-hydrogenated $C_5$ and $C_6$ sugars (e.g., sorbitan oleates, and the like), polyoxyethylene derivatives of the fatty acid esters, among others. Such silica dispersing aids can be used to replace all or part of expensive bifunctional silica coupling agents, while improving the processability of silica-filled rubber compounds by reducing the compound viscosity, increasing the scorch time, and reducing silica reagglomeration.

Without being bound to any particular theory, it is believed that, combination of the silica filler and the metal-functionalized polyisobutylene succinic anhydride derivative, in the presence of zero or a minimal amount of oil, such as greater than zero but less than 10 phr, for example, 1-5 phr, or greater than zero to 1 phr, gives rise to (1) a characteristic bonding between the silica filler and polyisobutylene group; (2) a characteristic suspension of filler particles in rubber matrix; and/or (3) a diversified range of interactions and structures in the rubber/silica composite. The resulting microstructure change is reflected in the bulk properties of rubber product. Rubber articles such as tires made from such rubber products can exhibit unexpected properties such as reduced rolling resistance, improved wet/snow traction and winter softness, improved dynamic stiffness, improved tensile strength, improved handling (cornering ability), among others.

In another example, a composition comprises (a) a silica filler, (b) a metal-functionalized polyisobutylene succinic anhydride derivative, (c) a rubber matrix, (d) an optional oil, and (e) one or more components selected from the group consisting of carbon black, vulcanizing agent, vulcanization accelerator, tackifier resin, antioxidant, fatty acids, zinc oxide, wax, peptizer, vulcanization retarder, activator, processing additive, plasticizer, pigments, and antiozonant. Various rubber products such as a tire and a power belt may be manufactured based on this composition.

The terms "rubber" and "elastomer" if used herein, may be used interchangeably, unless otherwise prescribed. The terms such as "rubber composition", "compounded rubber" and "rubber compound", if used herein, are used interchangeably to refer to "rubber which has been blended or mixed with various ingredients and materials" and "rubber compounding" or "compounding" may be used to refer to the "mixing of such materials." Such terms are well known to those having skill in the rubber mixing or rubber compounding art.

Carbon black is used as a reinforcing filler and normally provides or enhances good physical properties for sulfur cured rubber. Among the useful carbon blacks are furnace black, channel blacks and lamp blacks. More specifically, examples of useful carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which can be utilized include acetylene blacks. A mixture of two or more of the above blacks may also be used. Exemplary carbon blacks include N-110, N-220, N-339, N-330, N-343, N-351, N-550, N-660, as designated by ASTM D-1765-82a.

A typical amount of carbon black may broadly range from 5 phr to 200 phr, such as from 10 phr to 150 phr, and from 50 phr to 100 phr, based on 100 phr rubbery matrix in the composition.

A combination of silica and carbon black is utilized for reinforcing fillers for various rubber products, including treads for tires.

Other fillers can be utilized within the disclosed compositions as processing aids which include, but are not limited to, mineral fillers, such as aluminum silicate, calcium silicate, magnesium silicate, clay (hydrous aluminum silicate), talc (hydrous magnesium silicate), and mica as well as non-mineral fillers such as urea and sodium sulfate. Micas may contain principally alumina, silica and potash, although other variants are also useful.

In exemplified embodiments, an antioxidant under the trade name of Santoflex 13 was used in an amount of 0.1-5 phr, such as 0.95 phr, based on 100 phr rubbery matrix of the composition. Santoflex 13 is N-(1,3-dimethylbutyl)-N'-phenyl-p-phenylene diamine purchased from Monsanto (St. Louis, Mo.).

A vulcanizing agent can be used to cure the disclosed compositions that comprise a rubbery matrix and polymer nanoparticles. For a general disclosure of suitable vulcanizing agents, one can refer to Kirk-Othmer, *Encyclopedia of Chemical Technology*, $3^{rd}$ ed., Wiley Interscience, N.Y. 1982, Vol. 20, pp. 365 to 468, particularly "Vulcanization Agents and Auxiliary Materials," pp. 390 to 402. Vulcanizing agents can be used alone or in combination. In certain embodiments, sulfur or peroxide-based vulcanizing agent may be employed. Examples of suitable sulfur vulcanizing agents include "rubber maker's" soluble sulfur; elemental sulfur (free sulfur); sulfur donating vulcanizing agents such as organosilane polysulfides, amine disulfides, polymeric polysulfides or sulfur olefin adducts; and insoluble polymeric sulfur. The sulfur vulcanizing agent may be soluble sulfur or a mixture of soluble and insoluble polymeric sulfur.

Typical amount of vulcanizing agent such as sulfur may broadly range from 0.1 phr to 10 phr, such as from 0.5 phr to 5 phr, or from 1 phr to 4 phr, based on 100 phr rubbery matrix in the composition.

A vulcanization accelerator may be used along with a vulcanizing agent to control the time and/or temperature required for vulcanization and to improve properties of the vulcanizate. The vulcanization accelerators suitable for use in the disclosed compositions are not particularly limited. Examples of vulcanization accelerators include thiazol-containing vulcanization accelerators, such as 2-mercaptobenzothiazol, dibenzothiazyl disulfide, N-cyclohexyl-2-benzothiazyl-sulfenamide (CBS), N-tert-butyl-2-benzothiazyl sulfenamide (TBBS), and the like; guanidine-containing vulcanization accelerators, such as diphenylguanidine (DPG) and the like; amines; disulfides; thiurams; sulfenamides; dithiocarbamates; xanthates; and thioureas; among others.

The disclosed compositions may be compounded by methods generally known in the rubber compounding art, such as mixing the rubbery matrix polymer, the metal-functionalized polyisobutylene succinic anhydride derivative, and the silica filler with conventional amounts of various commonly used additive materials, using standard rubber mixing equipment and procedures.

A vulcanized rubber product may be produced from the compositions described herein by thermomechanically mixing a rubbery matrix polymer, the metal-functionalized polyisobutylene succinic anhydride derivative, the silica filler, and various ingredients in a sequentially step-wise manner in a rubber mixer, followed by shaping and curing of the composition. By thermomechanical mixing, it is meant that various ingredients in the composition are mixed under high shear conditions where the composition autogeneously heats up, with an accompanying temperature rise, as a result of the mixing primarily due to shear and associated friction within the composition in the rubber mixer.

Rubber articles such as tires may be manufactured from the composition as described supra. References for this purpose may be made to, for example, U.S. patent application 2004/0143064 A1.

The compositions described herein can be used for various purposes. For example, it can be used for various rubber compounds, such as a tire treadstock, sidewall stock or other tire component stock compounds. Such tires can be built, shaped, molded and cured by various methods which are known and will be readily apparent to those having skill in such art. In an embodiment, a molded unvulcanized tire is charged into a vulcanizing mold and then vulcanized to produce a tire, based on the composition and the procedure as described above.

The following examples are included to provide additional guidance to those skilled in the art. The examples provided are merely representative of the work that contributes to the teaching of the present application. Accordingly, these examples are not intended to limit the invention, as defined in the appended claims, in any manner.

EXAMPLES

Synthesis of Metal-Functionalized Polyisobutylene Succinic Anhydride Derivative:

Example 1

To a one gallon glass bottle 4000 ml of water and 40 g of sodium hydroxide (99% purity from Aldrich) were added. After the sodium hydroxide completely dissolved, 500 g of polyisobutylene succinic anhydride (with Mw=1900, Mn=1000 purchased from Chevron Chemicals under the trade name OLOA 15500, acid number 95) was added to the bottle. The mixture was then mixed vigorously at 90° C. for one hour. The resultant solution was a milk-like solution. This solution will be referred to as solution-A.

To a one-half-gallon-size glass bottle was added 2000 ml of water and 238 g of aluminum potassium sulfate dodecahydrate (98+% purity, from Aldrich). The mixture was then mixed vigorously at 80° C. for one hour until the solution was completely transparent. This solution will be referred to as solution-B.

Solution-A and solution-B were then combined, while still warm, and under vigorous stirring. The combination yielded a gel-like material. This material was washed with deionized water eight times, then dried at vacuum at 65° C. overnight. The final product was a gel-like material. This material could readily be dissolved in toluene or mixed into diene rubbers.

Rubber Application Examples

Three control rubber compositions (Control 1A, Control A, and Control B) were prepared according to the formulation shown in Tables 1 and 2. Each control composition corresponded to Example 1A, Comparative Example A and Comparative Example B.

The example composition (Example 1A) was prepared according to the formulation in Tables 1 and 2, except the synthesized material of Example 1 (above) was used to replace 15 phr of the aromatic oil. Comparative Examples A and B were also prepared according to the formulation in Tables 1 and 2, except dilauric aluminum soap (in Comparative Example A) and diethylhexanoic aluminum soap (in Comparative Example B) were used to replace 15 phr of the aromatic oil. In each example, a blend of the ingredients was kneaded by the method listed in Table 3. The aluminum-functionalized polyisobutylene anhydride derivative and metal soaps were added in the remill stage. In all cases, the final stock was sheeted and molded at 165° C. for 15 minutes.

It should be noted that other comparative examples were contemplated, such as unmodified succinic acid polyisobutylene and liquid polyisobutylene. However, addition of unmodified succinic acid polyisobutylene to the rubber composition will affect the cure resulting in an undercured sample, and thus will not produce useful comparative values under the tests conducted on the rubber composition examples exhibited in Table 4. Addition of liquid polyisobutylene to the rubber composition results in an unstable composition that will bleed during storage. This instability causes the compound properties to change. Therefore, neither of these potential comparisons were made.

TABLE 1

Composition for Master Batch

| | |
|---|---|
| SBR[1] | 100.00 |
| Precipitated silica filler[2] | 70.00 |
| Aromatic Oil[3] | 30.00 |

TABLE 1-continued

Composition for Master Batch

| | |
|---|---|
| Wax[4] | 1.50 |
| Stearic Acid[5] | 2.00 |
| Santoflex 13 (antioxidants)[6] | 0.95 |
| Si 69 (Silane Coupling Agent)[7] | 8.00 |

TABLE 2

Composition for Final Batch

| | |
|---|---|
| Sulfur | 1.70 |
| N-(cyclohexylthio) phthalimide (retarder) | 0.25 |
| Zinc Oxide | 2.50 |
| Cyclohexyl-benzothiazole sulfenamide (accelerator) | 1.50 |
| Diphenylguanidine (accelerator) | 0.50 |

TABLE 3

Mixing Conditions

| Mixer: 300 g Brabender | Agitation Speed: 60 rpm |
|---|---|
| Master Batch Stage | |
| Initial Temperature | 110° C. |
| 0 min | charging polymers |
| 0.5 min | charging oil and filler |
| 5.0 min | drop |
| Remill Stage | |
| Initial Temperature | 110° C. |
| 0 min | charging stocks |
| 5.0 min | drop |

TABLE 3-continued

Mixing Conditions

| Final Batch Stage | |
|---|---|
| Initial Temperature | 75° C. |
| 0 sec | charging master stock |
| 30 sec | charging curing agent and accelerators |
| 75 sec | drop |

[1]23.5% styrene, solution polymerized, Mooney viscosity at 100° C. = 55, 11% vinyl content; available from Firestone Synthetic (Akron, OH)
[2]Purchased from PPG (Pittsburgh, PA) as hydrate amorphous silica, trade name Hi Sil 190G
[3]Purchased from Mobil (Fairfax, VA) under the trade name Mobilsol 90
[4]Purchased from Aston Wax Corp. (Tilusville, PA)
[5]Purchased from Sherex Chemical (Dublin, OH)
[6]Chemical name: N-(1,3-dimethylbutyl)-N'-phenyl-P-phenylene-diamine; purchased from Monsanto (St. Louis, MO) under the trade name 6PPD
[7]Chemical name: bis-(3-triethoxy-silyl propyl) tetrasulfide; purchased from Degussa (Parsippany, NJ)

Of the resulting vulcanized rubber compositions, measurement of the tensile strength, tear strength, and hysteresis loss gave the results as shown in Table 4. Measurement of tensile strength is based on conditions of ASTM-D 412 at 22° C. Test specimen geometry was taken in the form of a ring of a width of 0.05 inches and of a thickness of 0.075 inches. The specimen was tested at a specific gauge length of 1.0 inch. The measurement of tear strength is based on the conditions of ASTM-D 624 at 170° C. Test specimen geometry was in the form of a nicked ring (ASTM-624-C). The specimen was tested at the specific gauge length of 1.750 inches. The dynamic properties were again evaluated with an Oscillatory Shear Dynamic Analyzer—ARIS. The test specimen geometry was taken in the form of a strip of a length of 30 mm and of a width of 15 mm. The following testing conditions were employed: frequency 5 Hz, 2% strain.

Table 4 shows three control rubber compositions (Control 1A, Control A, and Control B), an example of the presently disclosed rubber composition (Example 1A), and two comparative rubber composition examples (Comparative Examples A and B). The control examples use 30 phr of aromatic oil, while the other examples use 15 phr of a metal modified ingredient to replace 15 phr of the oil. Specifically, Example 1A uses 15 phr of aluminum-functionalized polyisobutylene succinic anhydride derivative and comparative examples replace part of the aromatic oil with an aluminum soap additive, these aluminum soap additives are the subjects of U.S. provisional application Ser. No. 61/018,006.

TABLE 4

| | Rubber Test: | Control 1A | Example 1A | Control A | Comparative Example A | Control B | Comparative Example B |
|---|---|---|---|---|---|---|---|
| SBR | | 100 | 100 | 100 | 100 | 100 | 100 |
| Silica filler | | 70 | 70 | 70 | 70 | 70 | 70 |
| Aromatic Oil | | 30 | 15 | 30 | 15 | 30 | 15 |
| Aluminum-Functionalized Polyisobutylene Derivative of Example 1 | | | 15 | | | | |
| dilauric aluminum soap | | | | | 15 | | |
| diethylhexanoic aluminum soap | | | | | | | 15 |
| MOONEY (130° C.) | $ML_{1+4}$(MU): | 55.6 | 62.9 | 54 | 59.7 | 48 | 67.3 |
| | t5 (min): | 49.57 | 33.18 | 53.67 | 26.3 | | |
| R-Tear (170° C.)[1] | Strength (N/mm) | 15.6 | 14.8 | 16.8 | 17.3 | 15.4 | 15 |
| | Travel (%) | 331 | 321 | 295 | 331 | 305.4 | 247.5 |
| R-Tensile (100° C.)[2] | M50 | 1.03 | 0.96 | 1.11 | 1.13 | 0.88 | 1.33 |
| | M300 | 6.54 | 6.00 | 6.18 | 7.14 | 5.38 | |
| | $T_b^4$ (Mpa) | 7.55 | 8.54 | 6.54 | 8.89 | 6.93 | 7.98 |
| | $E_b^5$ (%) | 339 | 381 | 317.1 | 358.2 | 367 | 285 |

TABLE 4-continued

| | Rubber Test: | Control 1A | Example 1A | Control A | Comparative Example A | Control B | Comparative Example B |
|---|---|---|---|---|---|---|---|
| R-Tensile (23° C.) | M50 | 1.38 | 1.17 | 1.3 | 1.48 | 1.07 | 1.59 |
| | M300 | 8.18 | 7.01 | 7.55 | 8.47 | 6.48 | 10.42 |
| | Tb (MPa) | 19.7 | 20.82 | 16.95 | 20.23 | 16.13 | 17.53 |
| | Eb (%) | 572 | 642 | 545.6 | 573.1 | 565 | 448 |
| Temperature Sweep[3] 0.5%, 5 Hz | G' (MPa) @ 60° C. | 7.61 | 7.24 | 8.06 | 8.07 | 5.657 | 9.145 |
| | G" (MPa) @ 60° C. | 1.01 | 0.93 | 1.10 | 1.07 | 0.818 | 1.223 |
| | tanδ @ 60° C. | 0.132 | 0.128 | 0.136 | 0.132 | 0.145 | 0.134 |
| Wet Traction | Stanley London | 64 | 68 | 56.3 | 59.1 | 54.4 | 58.5 |

[1] R-Tear measurements indicate the tear strength of the compound.
[2] R-Tensile measurements indicate the tensile strength.
[3] Temperature Sweep Data indicates rolling resistance.
[4] Tb means strength at break.
[5] Eb means elongation at break.
[6] G' is the storage modulus.
[7] G" is the loss modulus.

While the invention has been illustrated and described in typical embodiments, it is not intended to be limited to the details shown, since various modifications and substitutions can be made without departing in any way from the spirit of the present invention. As such, further modifications and equivalents of the invention herein disclosed may occur to persons skilled in the art using no more than routine experimentation, and all such modifications and equivalents are believed to be within the spirit and scope of the invention as defined by the following claims.

The invention claimed is:

1. A composition comprising:
a vulcanizable diene rubber; and
one or more metal-functionalized polyisobutylene succinic anhydride derivatives;
wherein the metal-functionalized polyisobutylene succinic anhydride derivatives are the reaction product of a metal ion source and polyisobutylene succinic anhydride;
wherein the metal of the metal-functionalized polyisobutylene succinic anhydride derivatives is selected from the group consisting of Group III and transition metals.

2. The composition of claim 1, wherein the metal is aluminum, iron, or titanium.

3. The composition of claim 1, wherein the one or more metal-functionalized polyisobutylene succinic anhydride derivatives is a reaction product of polyisobutylene succinic anhydride and aluminum potassium sulfate dodecahydrate.

4. The composition of claim 1, in which the one or more metal-functionalized polyisobutylene succinic anhydride derivatives has a weight average molecular weight of 500 to 100,000.

5. The composition of claim 1, in which the one or more metal-functionalized polyisobutylene succinic anhydride derivatives has a weight average molecular weight of 500 to 10,000.

6. The composition of claim 1, in which the polyisobutylene group comprises from 4 to 100,000 carbon atoms.

7. The composition of claim 1, in which the polyisobutylene group comprises from 4 to 64 carbon atoms.

8. The composition of claim 1, wherein the composition is essentially free of aromatic oil.

9. The composition of claim 8, wherein the composition is essentially free of oil.

10. The composition of claim 1, wherein the composition comprises less than 15 phr of aromatic oil.

11. The composition of claim 10, wherein the composition comprises less than 15 phr of oil.

12. The composition of claim 1, in which the metal is aluminum.

13. The composition of claim 1, in which the amount of the one or more metal-functionalized polyisobutylene succinic anhydride derivatives in the composition ranges from 15 phr to 30 phr, based on 100 phr rubbery matrix in the composition.

14. The composition of claim 1, further comprising silica filler.

15. The composition of claim 14, wherein the silica filler comprises precipitated silica filler, fused silica filler, colloidal silica filler, or any mixture thereof, wherein the aggregated size of the silica ranges from 10 nm to 20 μm.

16. The composition of claim 14, in which the amount of the silica filler ranges from 50 phr to 80 phr, based on 100 phr rubbery matrix of the composition.

17. The composition of claim 1, in which the vulcanizable diene elastomer comprises polyisoprene rubber, styrene-butadiene rubber (SBR), styrene-isoprene-butadiene rubber, styrene-isoprene rubber, butadiene-isoprene rubber, polybutadiene, butyl rubber, neoprene, ethylene-propylene-diene rubber (EPDM), acrylonitrile-butadiene rubber (NBR), hydrogenated nitrile rubber, or mixtures thereof.

18. The composition of claim 1, further comprising an oil selected from aromatic oil, naphthenic oil, paraffinic oil, low PCA oil, and mixtures thereof.

19. A tire tread composition comprising:
(a) a reinforcing filler,
(b) one or more metal-functionalized polyisobutylene succinic anhydride derivatives,
(c) a rubber matrix,
(d) an optional oil, and
(e) one or more components selected from the group consisting of carbon black, vulcanizing agent, vulcanization accelerator, tackifier resin, antioxidant, fatty acids, zinc oxide, wax, peptizer, vulcanization retarder, activator, processing additive, plasticizer, pigments, and antiozonant;
wherein the metal-functionalized polyisobutylene succinic anhydride derivatives are the reaction product of a metal ion source and polyisobutylene succinic anhydride;
wherein the metal of the metal-functionalized polyisobutylene succinic anhydride derivatives is selected from the group consisting of Group III and transition metals.

20. The tire tread of claim 19, wherein the reinforcing filler includes silica.

21. A tire including the composition of claim 19.

22. A method of making a rubber composition comprising:
   combining a solvent, a base, and one or more metal-functionalized polyisobutylene succinic anhydride derivatives and mixing to form solution A;
   adding a source of metal ions to solution A and mixing to form a product A, the metal being selected from the group consisting of group III and transition metals, whereby product A includes a metal-functionalized polyisobutylene succinic anhydride derivative;
   combining the metal-functionalized polyisobutylene succinic anhydride derivative with a diene rubber.

23. The method of claim 22 further comprising adding a silica filler.

24. A composition comprising:
   a vulcanizable diene rubber;
   a reinforcing filler; and
   0.1 to 100 phr of one or more metal-functionalized polyisobutylene succinic anhydride derivatives;
   wherein the metal-functionalized polyisobutylene succinic anhydride derivatives are the reaction product of a metal ion source and polyisobutylene succinic anhydride.

\* \* \* \* \*